(12) United States Patent
Hajianpour

(10) Patent No.: US 8,584,997 B2
(45) Date of Patent: Nov. 19, 2013

(54) SUCTION CUP APPARATUS FOR ATTACHMENT TO POROUS AND NONPOROUS SURFACES

(75) Inventor: Zoya Hajianpour, Fort Lauderdale, FL (US)

(73) Assignee: Zoya, Inc., Fort Lauderdale, FL (US)

( * ) Notice: Subject to any disclaimer, the term of this patent is extended or adjusted under 35 U.S.C. 154(b) by 56 days.

(21) Appl. No.: 12/932,079

(22) Filed: Feb. 17, 2011

(65) Prior Publication Data

US 2012/0097821 A1   Apr. 26, 2012

Related U.S. Application Data

(63) Continuation-in-part of application No. 12/925,428, filed on Oct. 21, 2010, now Pat. No. 8,348,216.

(51) Int. Cl.
*A45D 42/14* (2006.01)
*F16B 47/00* (2006.01)

(52) U.S. Cl.
USPC .................. 248/205.5; 248/205.8; 248/206.1; 248/363

(58) Field of Classification Search
USPC ............. 248/205.5, 205.8, 206.1, 206.2, 363; 428/99, 212
See application file for complete search history.

(56) References Cited

U.S. PATENT DOCUMENTS

| | | | |
|---|---|---|---|
| 2,853,333 A * | 9/1958 | Littell | 294/189 |
| 2,940,713 A * | 6/1960 | Van Dusen | 248/205.8 |
| 3,020,017 A * | 2/1962 | Watson | 248/205.8 |
| 5,411,230 A * | 5/1995 | Messinger | 248/205.8 |
| 5,909,758 A * | 6/1999 | Kitamura | 16/406 |
| 5,992,806 A | 11/1999 | Adams | |
| 6,478,271 B1 * | 11/2002 | Mulholland | 248/205.8 |
| 6,572,569 B2 | 6/2003 | Klein | |
| 6,666,420 B1 * | 12/2003 | Carnevali | 248/205.8 |
| 6,805,041 B2 * | 10/2004 | Colston et al. | 99/295 |
| 6,827,344 B1 * | 12/2004 | Ristau | 269/21 |
| D527,616 S | 9/2006 | Hajianpour | |
| 7,628,362 B2 * | 12/2009 | Song | 248/205.8 |
| 7,635,111 B2 * | 12/2009 | Hara et al. | 248/205.8 |
| 7,690,609 B2 * | 4/2010 | Akai et al. | 248/205.5 |
| 7,690,610 B2 * | 4/2010 | Ristau | 248/206.2 |
| 7,850,133 B2 * | 12/2010 | Carnevali | 248/205.5 |
| 2003/0161991 A1 | 8/2003 | Henderson | |
| 2008/0078896 A1 * | 4/2008 | Browne et al. | 248/205.8 |
| 2008/0230662 A1 * | 9/2008 | Takahashi et al. | 248/206.2 |

* cited by examiner

*Primary Examiner* — Anita M King
(74) *Attorney, Agent, or Firm* — Ronald V. Davidge

(57) ABSTRACT

A device for attachment to both porous and non-porous wall surfaces includes a suction cup of a first type having an elastomeric core and an elastomeric outer layer that is substantially softer than the inner layer. The outer layer includes material that fills pores within a porous surface against which the suction cup is held. The inner layer prevents tearing of the suction cup and causes a partial vacuum to be formed as the suction cup attempts to return to its original shape following depression against a wall surface. Alternately, the device may include a suction cup having a number of concentric ridges held against porous surface, with the suction cup being formed of a single elastomeric material or of elastomeric materials including a softer elastomeric outer layer.

12 Claims, 6 Drawing Sheets

SUCTION CUP APPARATUS FOR ATTACHMENT TO POROUS AND NONPOROUS SURFACES

RELATED APPLICATIONS

This is a continuation in part of U.S. patent application Ser. No. 12/925,428, filed Oct. 21, 2010 now U.S. Pat. No. 8,348,216.

FEDERALLY SPONSORED RESEARCH OR DEVELOPMENT

Not Applicable

BACKGROUND OF THE INVENTION

1. Field of the Invention

This invention relates to a suction cup apparatus for attachment to a wall surface, and, more particularly to such an apparatus capable of being securely attached both to porous and nonporous surfaces.

2. Summary of the Background Information

A number of devices are available for attaching objects to walls using suction cups. In the simplest form of such a device, the central portions of one or more suction cups are directly attached to a housing or frame of the device. Each of the suction cups, which are composed of an elastomeric material, includes a concave surface held against the wall. For example, the elastomeric suction cups are pressed into place on the rigid frame of the device, or an elastomeric material may be molded over a rigid plastic frame to form one or more suction cups extending outward from the frame. When the device is pressed toward the wall, a portion of the air held between the concave surface and the wall is pushed outward, past the periphery of each suction cup. Then, after the device is released, as each suction cup tries to return to its original shape while the shape of the suction cup extending to its periphery blocks the inward movement of air, a partial vacuum is formed between the concave surface and the wall, holding the device in place on the wall.

In another type of suction cup device, the central portion of a suction cup is attached to an actuator, while the periphery of the suction cup is held by a ring forming part of the device. First, the periphery of the suction cup is held against the wall with the actuator holding the central portion of the suction cup close to the wall. Then, as the periphery of the suction cup remains against the wall, the actuator is moved so that the central portion of the suction cup is moved away from the wall, increasing the volume of the space between the concave surface of the suction cup and the wall to form a partial vacuum within this space, holding the device in place on the wall. Again, the shape of the suction cup extending to its periphery blocks the inward flow of air.

Both types of suction cup generally work well on hard and smooth wall surfaces, such as ceramic tile, glass, stainless steel, or painted metal. However, when the suction cup is attached to a wall having a porous surface, such as painted gypsum wallboard, the porosity of the wall surface allows a slow leakage of air past the periphery of the suction cup into the space between the concave surface of the suction cup and the wall. This leakage of air reduces the level of partial vacuum within this space, so that the device falls off the wall, typically within a few hours to two weeks after its installation on the wall.

A number of devices include cylindrical cavities with spaced-apart ridges that facilitate grasping generally cylindrical objects held within the cavities.

SUMMARY OF THE INVENTION

According to one aspect of the invention, a suction cup including a peripheral edge and an outward-facing surface is provided. The outward facing surface has a concave central portion and an annular peripheral portion extending radially from the concave central portion to the peripheral edge. The annular peripheral portion of the outward-facing surface includes a plurality of spaced-apart concentric ridges.

The suction cup may be composed of a single elastomer. Alternately, the suction cup may additionally comprise a core, composed of a first elastomer, and an outer layer, composed of a second elastomer, with the second elastomer being substantially softer than the first elastomer, and with the outer layer forming at least the annular peripheral portion of the outward-facing surface. The outer layer may additionally cover other surfaces of the core.

Preferably, the first elastomer has a hardness in the range of Shore A 50 to Shore A 70, while the second elastomer has a hardness in the range of Shore A 10 to Shore A 40. The outer layer preferably has a thickness in the range of 0.8 mm to 1.8 mm. Preferably, the first and second elastomers are thermoplastic elastomers, silicone rubbers, or urethane elastomers.

The relatively high level of hardness of the first elastomer is needed to prevent tearing and to provide sufficient force to form a partial vacuum between the concave surface and a surface to which the suction cup is attached, such as a wall. The relatively low level of hardness of the second elastomer is needed to provide for reliable attachment to a porous surface, such as a gypsum wallboard, with the elastomeric material moving into pores within the porous surface.

According to another aspect of the invention, apparatus for attachment to a wall, comprising a housing and a suction cup as described above, is provided, with the suction cup being attached to the housing. The central portion of the core may be attached to the housing, with the peripheral portion being inwardly deflectable. Alternately, the apparatus additionally includes an actuator attaching the central portion of the suction cup to the housing. The actuator is mounted on the housing to be moved between a released position and an engaged position, with the central portion being moved in an inward direction as the actuator is moved from the released position to the engaged position. The housing includes a ring preventing movement of the peripheral portion of the core as the actuator is moved from the released position to the engaged position.

DETAILED DESCRIPTION OF THE INVENTION

Figure 1:
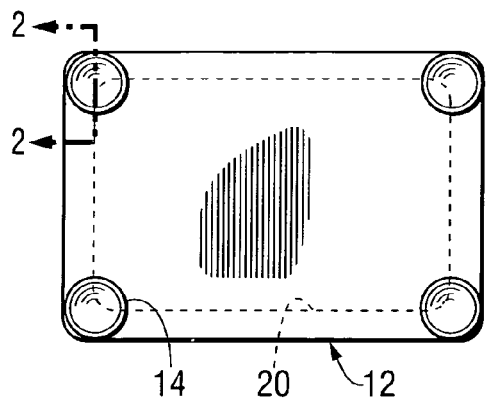
FIG. 1 is a rear elevation of a device built in accordance with a first embodiment of the invention.
Figure 3:
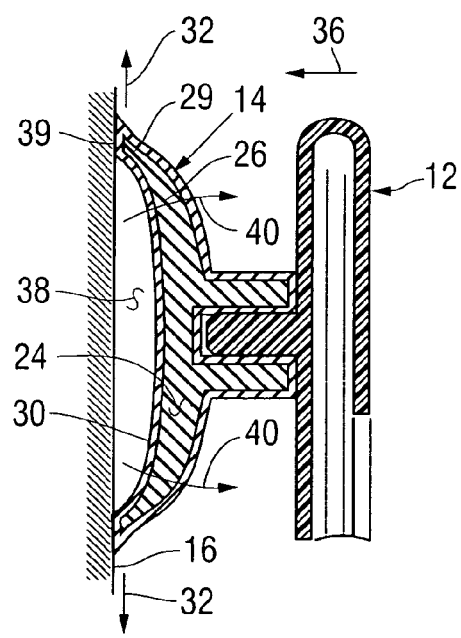
FIG. 3, is a fragmentary side elevation of the device of FIG. 1, shown as attached to a wall surface.

FIG. 1 is a rear elevation of an device 10 for attachment to a wall built in accordance with a first embodiment of the invention to include a housing 12 and four suction cups 14 for attaching the device 10 to a wall surface 16 (shown in FIG. 3.)

Figure 2:
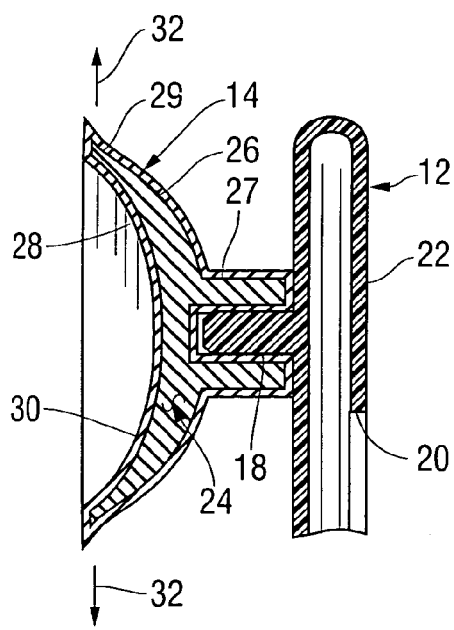
FIG. 2 is a fragmentary cross-sectional side elevation of the device of FIG. 1, taken as indicated by section lines 2-2 therein, showing a suction cup therein.

FIG. 2 is a fragmentary cross-sectional side elevation of the device 10, taken as indicated by section lines 2-2 in FIG. 1 to show one of the suction cups 14, which is attached to the housing 12 by being pushed onto a pin 18 forming part of the housing 12. For example, the housing 12 is formed as a picture holder having an opening 20 in a front surface 22. In accordance with the invention, the suction cup 14 comprises a core 24, composed of a relatively tough elastomeric material, and an outer layer 26, composed of a relatively soft elastomeric material. The core 24 forms a central portion 27, a disk-shaped portion 28, and an annular peripheral portion 29. The disk-shaped portion 28 has an outward-facing concave surface 30 extending radially, in the directions of arrows 32, from the central portion 27 to the annular peripheral portion 29. The outer layer 26 may be formed by overmolding.

FIG. 3 is a fragmentary cross-sectional side elevation of the device 10, again taken as indicated by section lines 2-2, showing the suction cup 14 as it is deflected by engagement with the wall surface 16. The device 10 is attached to the wall surface 16 by pressing the device 10 in the outward direction of arrow 36, toward the wall surface 16, with the suction cups 14 held against the wall surface 16, so that some of the air held within a space 38 between the concave surface 30 and the wall surface 16 is pushed radially, in the directions of arrows 32. Then, after the device 10 is released, each of the suction cups 10 attempts to return to its original shape, as shown in FIG. 2, enlarging the space 38 so that a partial vacuum is formed within this space 38, holding the annular peripheral portion 29 of the suction cup 14 against the wall surface 16. It is noted that, as air moves radially out, in the directions of arrows 32 along an outer surface 39 adjacent the annular peripheral portion 29, resulting forces, acting on the annular peripheral portion 29 in the directions of arrows 32 form torques in the directions of arrows 40, which move the annular peripheral portion 29 away from the wall surface 16, allowing the airflow to continue. On the other hand, when air attempts to move inward, opposite the directions of arrows 32 along the outer surface 39, resulting forces, acting on the annular peripheral portion 29 opposite the directions of arrows 40, push the annular peripheral portion 29 toward the wall surface 16, preventing the movement of air into the space 38.

The outer layer 26 provides the suction cup 14 with an outer surface 39 that is soft enough to move into pores within the wall surface 16, as the peripheral portion 34 is held against the wall surface 16, blocking a movement of air through these pores when the suction cup 14 is attached to a porous wall surface 16. The suction cup 14 is thus rendered capable of attaching the housing 12 to a porous wall surface, such as a gypsum wallboard surface, for a long period of time. On the other hand, a conventional suction cup (not shown), composed of a relatively tough elastomeric material without the softer outer layer 26, can only hold an object in place on such a porous surface for a few hours, due to an inward migration of air, opposite the directions of arrow 30, through pores within the wall surface 13, reducing the partial vacuum within the space 38.

The relatively tough elastomeric core 24 is needed to provide the suction cup 14 with sufficient rigidity to prevent tearing of the suction cup 14, which could occur, particularly during the removal of the suction cup 14 from the wall surface 16, if the suction cup 14 were composed entirely of the relatively soft material forming the outer layer 26. Furthermore, the relatively tough elastomeric core 24 is needed to provide the suction cup 14 with sufficient rigidity to form the partial vacuum within the space 38, needed to hold the suction cup 14 in place on the wall surface 16 during an attempt of the suction cup 14 to return to its original shape, as shown in FIG. 2.

Preferably, the elastomeric core 24 is composed of an elastomeric material with a hardness within the range of Shore A 50 to Shore A 70, while the outer layer 26 is composed of an elastic material having a hardness in the range of Shore A 10 to Shore A 40. Preferably, the outer layer 26 has a thickness within a range of 0.8 mm (0.03 in.) to 1.8 mm (0.07 in.). For example, the elastomeric core 24 and the outer layer 26 are composed of TPEs (thermoplastic elastomers), silicone rubbers, or urethane elastomers.

Figure 4:
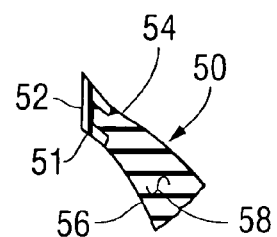
FIG. 4 is a fragmentary side elevation of an alternate suction cup for use in the device of FIG. 1.

FIG. 4 is a fragmentary cross-sectional elevation of an alternative suction cup 50, having a relatively soft outer elastomeric layer 51 extending along the contact surface 52 of the peripheral portion 54 without extending over all other surfaces 56 of the core 58. Since this contact surface 52 is the only portion of the alternative suction cup 50 that is held against the wall surface 16, the presence of the soft elastomeric layer 51 on this contact surface 52 provides the advantage of migration of the softer elastomeric material into pores within the wall surface 16 without a need to cover the other surfaces 56 of the core 58 with the soft elastomeric layer 51.

Figure 5:
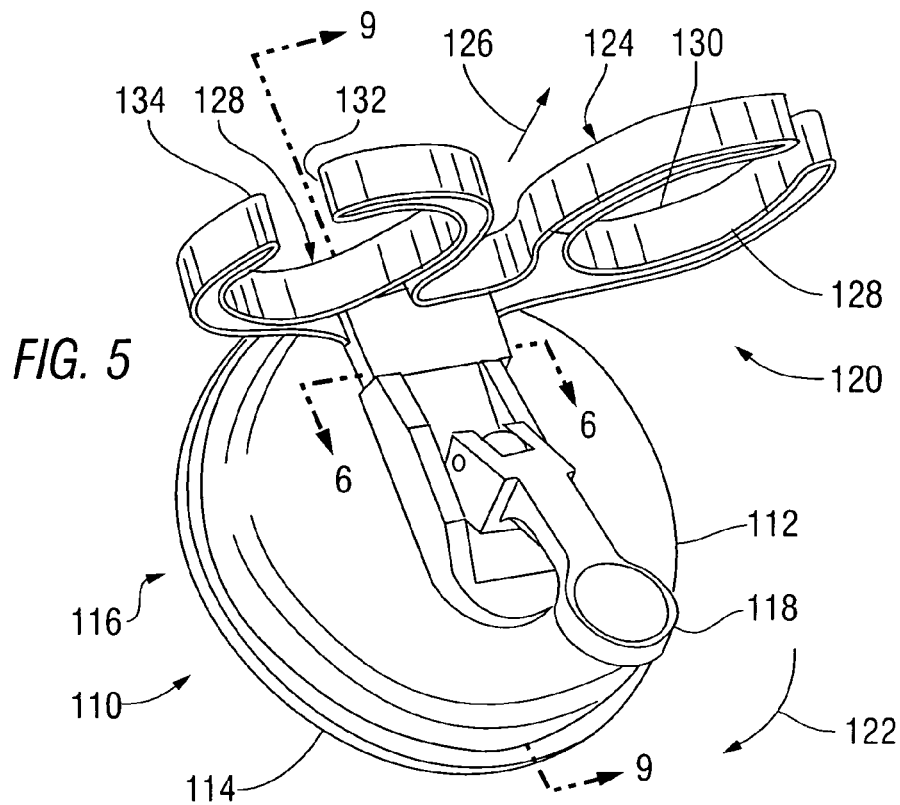
FIG. 5 is a perspective view of a device built in accordance with a second embodiment of the invention.

FIG. 5 is a perspective view of a device 110, built in accordance with a second embodiment of the invention, shown as seen from below, in front, and from the left. The device 110 includes a housing 112, a suction cup 114 extending along a rear side 116 of the housing, a pivoted actuator 118, and a bracket 120. When the suction cup 114 is held against a wall surface (not shown), the pivoted actuator 118 is moved in a first direction, indicated by arrow 122, to cause the suction cup 114 to be held against the wall surface, and opposite the first direction to cause the suction cup 114 to be released from the wall surface. The bracket 120 includes a plate 124, extending forward, in the direction of arrow 126, having a pair of apertures 128 for holding a pair of electrical appliances (not shown). Each of the apertures 124 includes a rounded portion 130, which is sized to extend around a handle of an electrical appliance (not shown), and a slot 132, extending forward to an edge 134 of the plate 124. Each of the slots 132 is provided so that an electrical appliance may be placed within the aperture 124 with its power cord extending downward to an electrical outlet.

Figure 6:
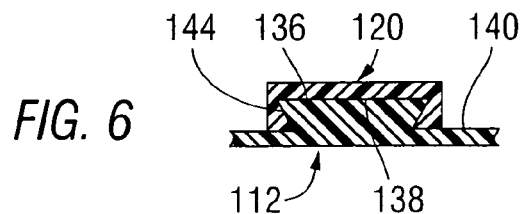
FIG. 6 is a fragmentary cross-sectional plan view of a housing and a bracket in the device of FIG. 5, taken as indicated by section lines 2-2 therein.

FIG. 6 is a fragmentary cross-sectional plan view of the housing 112 and the bracket 120, taken as indicated by section lines 6-6 in FIG. 5 to show a housing track 136 forming a portion of the housing 112 and a bracket track 138 forming a portion of the bracket 120. The housing track 134 extends along a front side 140 of the housing 112 in a first direction, indicated by arrow 142, which is parallel to the rear side 116 of the housing 112, allowing the device 110 to be attached to a vertical wall surface with the first direction facing downward. The bracket track 138 extends along the housing track 134, also in the first direction, indicated by arrow 142 with a dovetail arrangement 144 being provided to maintain alignment of the bracket track 138 with the housing track 136. The plate 124 extends perpendicular to the direction of the bracket track 138, so that, when the device 110 is aligned on a wall with the first direction facing downward, the plate 124 will extend horizontally, in an orientation appropriate for holding electrical appliances within the apertures 128.

Figure 7:
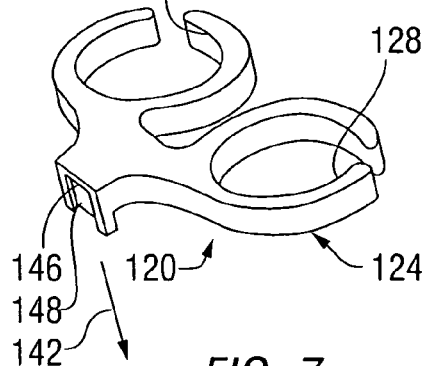
FIG. 7 is a perspective view of the bracket within the appliance holder of FIG. 5.

FIG. 7 is a perspective view of the bracket 120, shown as removed from the housing 112. The bracket track 138 extends in the downward direction of arrow 142 between a closed upper end 146 and an open lower end 148, which is placed over the upper end of the housing track 136 before moving the bracket 120 downward, with the bracket track 138 engaging the housing track 134.

Figure 8:
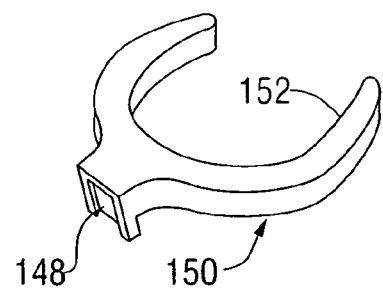
FIG. 8 is a perspective view of an alternative bracket for attachment to the housing within the appliance holder of FIG. 5.

FIG. 8 is a perspective view of an alternative bracket 150 for attachment to the housing 112, which includes the bracket track 138 as described above in reference to FIGS. 6 and 7, allowing the alternative bracket 150 to be attached to the housing 112 in place of the bracket 120. The alternative bracket 150 includes, for example, a larger opening 152 to hold a cup or a larger appliance handle. A single housing 112 may be provided with a plurality of different brackets 120, 150 so that various functions can be performed. Since each of the different brackets 120, 150 can be placed on the housing 112 from above to be held in place on the housing 112 by gravity, the changing of brackets on a single housing 112 is easily performed, even without removing the housing 112 from a wall to which it is attached.

Figure 9:
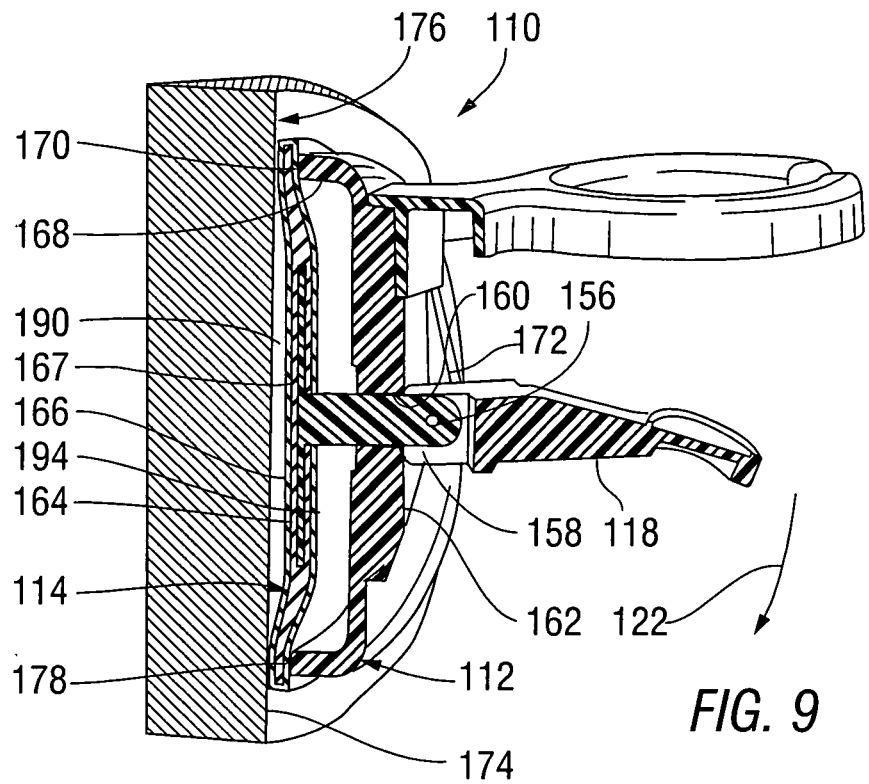
FIG. 9 is a cross-sectional perspective view of the appliance holder of FIG. 5 with a pivoted actuator therein in a released position, taken as indicated by section lines 9-9 in FIG. 5.
Figure 10:
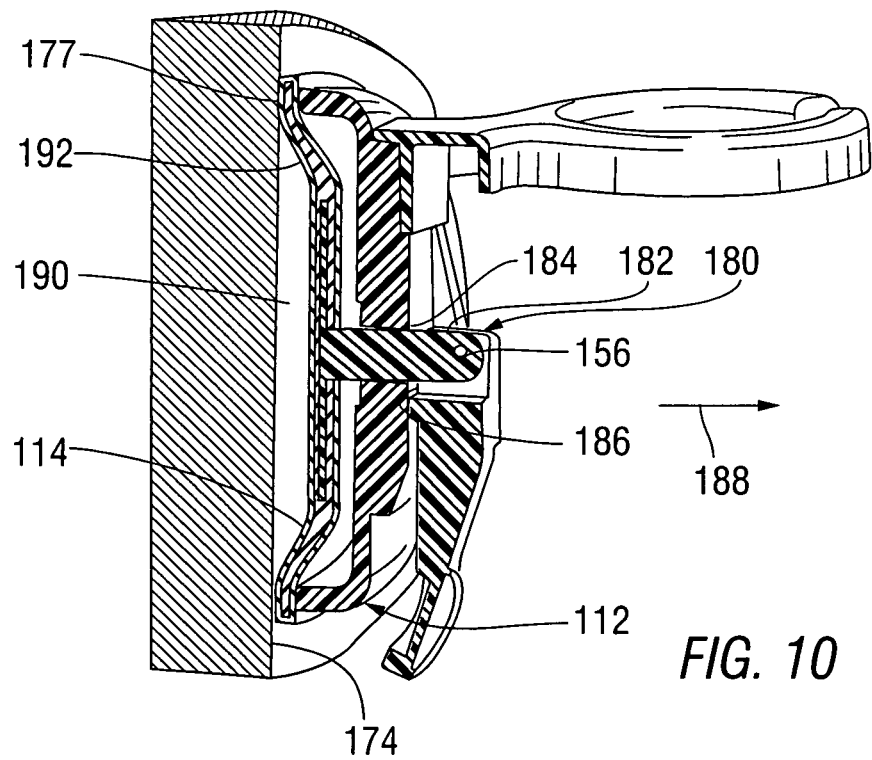
FIG. 10 is a cross-sectional perspective view of the appliance holder of FIG. 5 with the pivoted actuator therein in an actuated position, taken as indicated by section lines 9-9 in FIG. 5.

FIGS. 9 and 10 are cross-sectional perspective views of the device 110, taken as indicated by section lines 9-9 in FIG. 5, with the pivoted actuator 118 being shown in a released position in FIG. 9 and in an actuated position in FIG. 10. The pivoted actuator 118 is pivotally mounted by a pin 156 extending through a shaft 158, which in turn extends through a central hole 160 in a front side 162 of the housing 112. The shaft 158 includes a flange 164, which is disposed within a central portion 166 of a core 167 within the suction cup 114, causing this central portion 166 to move with the shaft 158. The core 167 is composed of an elastomeric material molded over the flange 164. The shaft 158 holds the suction cup 114 in a position extending across and within a rear opening 168 within a rear side 170 of the housing 112. The housing 112 additionally includes a sidewall 172 extending forward at each side of the pivoted actuator 118, holding the pivoted actuator 118 in place so that it can pivot only about the shaft 156.

The process of attaching the appliance holder to a surface 174 of a wall 176 begins with the pivoted actuator in the released position indicated in FIG. 9. As the device 110 is held against the surface 174, an annular peripheral portion 177 of the suction cup 114 is held against a ring-shaped peripheral surface 178 of the housing 112, which extends long the rear side 170 around the rear opening 168. Then, the pivoted actuator 118 is moved in the direction of arrow 122 into the actuated position as shown in FIG. 10. The pivoted actuator 118 has a cam surface 180, with a first portion 182 held against a central surface 184 of the housing 112 with the pivoted actuator 118 in the released position of FIG. 9, and with a second portion 186 held against the central surface 184 with the pivoted actuator 118 in the actuated position of FIG. 10. Since the first portion 182 is closer to the pivot pin than the second portion 186, moving the pivoted actuator 118 from the released position of FIG. 9 to the actuated position of FIG. 10 moves the shaft 158 in the forward direction indicated by arrow 188, so that a space 190 between the wall surface 174 and the suction cup 114 is enlarged, forming a partial vacuum within the space 190 so that the device 110 is held in place against the wall surface 174. Deflection occurs within a disk-shaped portion 192 of the core 167 of the suction cup 114.

In accordance with the invention, the suction cup 114 additionally includes an outer layer 194 of an elastomeric material that is substantially softer than the material forming the core 167. This outer layer 194 may cover the entire core 167, or it may be cover only the portion of the suction cup 114 that is brought into engagement with the surface 174 of the wall 176. Other aspects of the materials forming the core 167 and the outer layer 194 are as described above in reference to FIGS. 2-5.

Figure 11:
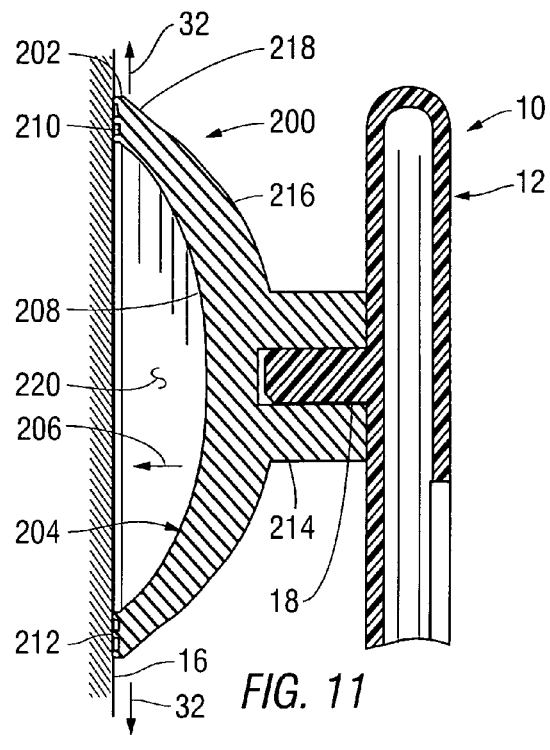
FIG. 11 is a fragmentary cross-sectional side elevation of the device of FIG. 1, taken as indicated by section lines 2-2 therein, showing a first alternative suction cup employed therein.
Figure 13:
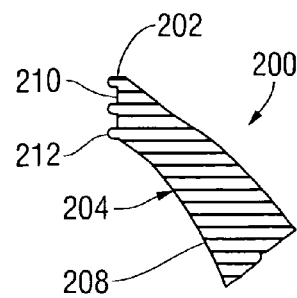
FIG. 13 is a fragmentary cross-sectional side elevation of the suction cup of FIG. 11.
Figure 12:
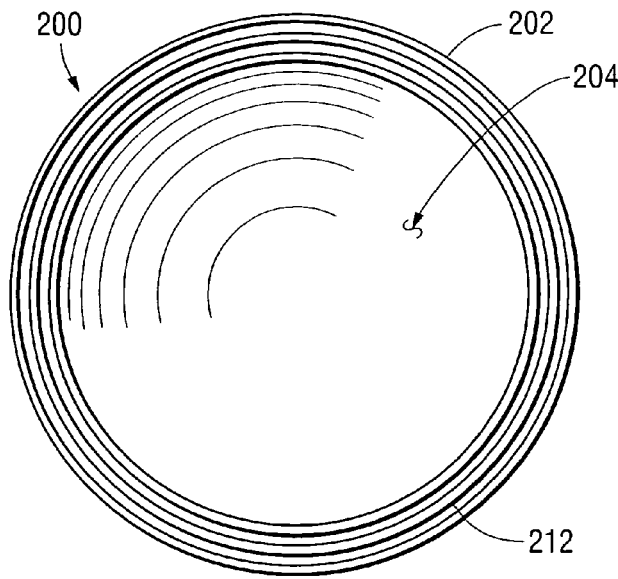
FIG. 12 is a rear elevation of the suction cup of FIG. 11.

A first alternative suction cup 200, configured for use within the device 10 described above in reference to FIG. 1, will now be discussed, with reference being made to FIGS. 11-13. FIG. 11 is a fragmentary cross-sectional side elevation of the device 10, taken as indicated by section lines 2-2 in FIG. 2, including the first alternative suction cup 200 in place of the suction cup 14 described above in reference to FIGS. 2 and 3, placed against a wall surface 16. (Elements similar to those described above in reference to FIGS. 1-3 are herein accorded like reference numbers.) FIGS. 12 and 13 additionally show the first alternative suction cup 200, with FIG. 12 being a rear elevation thereof and with FIG. 13 being a fragmentary cross-sectional side elevation thereof. The first alternative suction cup 200 includes a peripheral edge 202 and an outward-facing surface 204, i.e., a surface facing outward, in the direction of arrow 206, toward the wall surface 16. The outward-facing surface 204 includes a concave central surface portion 208 and an annular peripheral surface portion 210, which in turn includes a plurality of spaced-apart concentric ridges 212. The suction cup 200 is composed of a single elastomer forming a central structural portion 214, disk-shaped structural portion 216, and an annular peripheral structural portion 218. Other features of this application of the suction cup 200 are as described above in reference to FIGS. 2 and 3, with a the suction cup 200 being attached to a housing 12 by means of a pin 18 extending into the central structural portion 214 from the housing 12, and with a space 220 formed between the concave central surface portion 208 and a wall surface 16 as the suction cup 200 is pressed against the wall surface 16. The concentric ridges 212 are held against the wall surface 16 by forces developed as described in detail in reference to FIG. 3.

Since the total area of the contact surfaces formed between the concentric ridges 212 and the wall surface 16 is much less than the contact area that would be formed between the annular peripheral surface portion 210 of the outward facing surface 204 in the absence of the concentric ridges 212, providing the concentric ridges 212 to be disposed adjacent the wall surface 16 substantially increases the local pressure exerted at the contact surfaces between the outward facing surface 204 and the wall surface 16 for a given total force exerted between these surfaces 204, 16. This increase in contact pressure increases the ability of the elastomeric material forming the outward facing surface 204 to flow into pores and other irregularities of the wall surface 16. Furthermore, since each of the concentric ridges 212 extends entirely around the concave central surface portion 210 a plurality of barriers are formed by the concentric ridges 212 to a flow of air opposite the directions of arrows 32 into the space 220.

Figure 14:
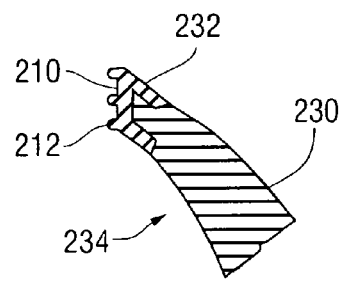
FIG. 14 is a fragmentary cross-sectional side elevation of a first alternative version of the suction cup of FIG. 11.
Figure 15:
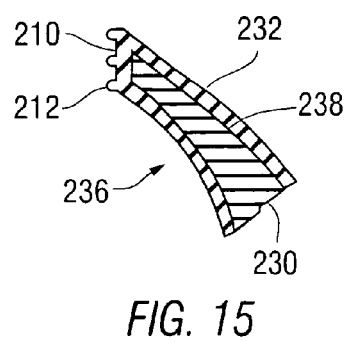
FIG. 15 is a fragmentary cross-sectional side elevation of a second alternative version of the suction cup of FIG. 11.
Figure 16:
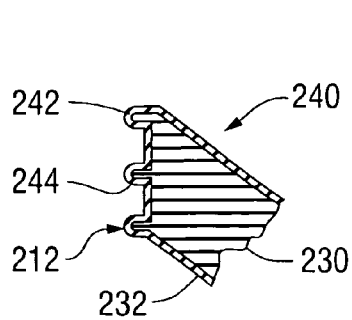
FIG. 16 is a fragmentary cross-sectional side elevation of a third alternative version of the suction cup of FIG. 11.

Alternative versions of the first alternative suction cup 200 will now be discussed, with reference being made to FIGS. 14-16. Each of these alternate versions includes a core 230, composed of a first elastomer, and an outer layer 232, composed of a second elastomer, which is substantially softer than the first elastomer. FIG. 14 is a fragmentary elevation of a first alternative version 234, in which the outer layer 232 forms the outer peripheral surface portion 210, while FIG. 15 is a fragmentary elevation of a second alternative version 236 in which the outer layer 232 covers other surfaces 238 of the core 230. In both the first alternative version 234 and the second alternative version 236, the concentric ridges 212 are formed entirely within the outer layer 232. FIG. 16 is a fragmentary elevation of a third alternative version 240, in which inner portions 242 of the concentric ridges 212 are formed within the core 230, with outer portions 244 of the concentric ridges 212 then being formed over the inner portions 242.

Figure 17:
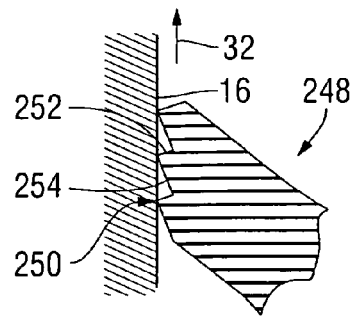
FIG. 17 is a fragmentary cross-sectional side elevation of a fourth alternative version of the suction cup of FIG. 11.

FIG. 17 is a fragmentary elevation of a fourth alternative version 248, in which concentric ridges 250 are formed to have relatively short surfaces 252 intersecting relatively long surfaces 254, with the concentric ridges 250 being configured to favor a flow of air outward, in the direction of arrow 32, as described above in reference to FIG. 3, while resisting a flow of air inward, opposite the direction of arrow 32, as the fourth alternative version 248 is held against the wall surface 16.

Figure 18:
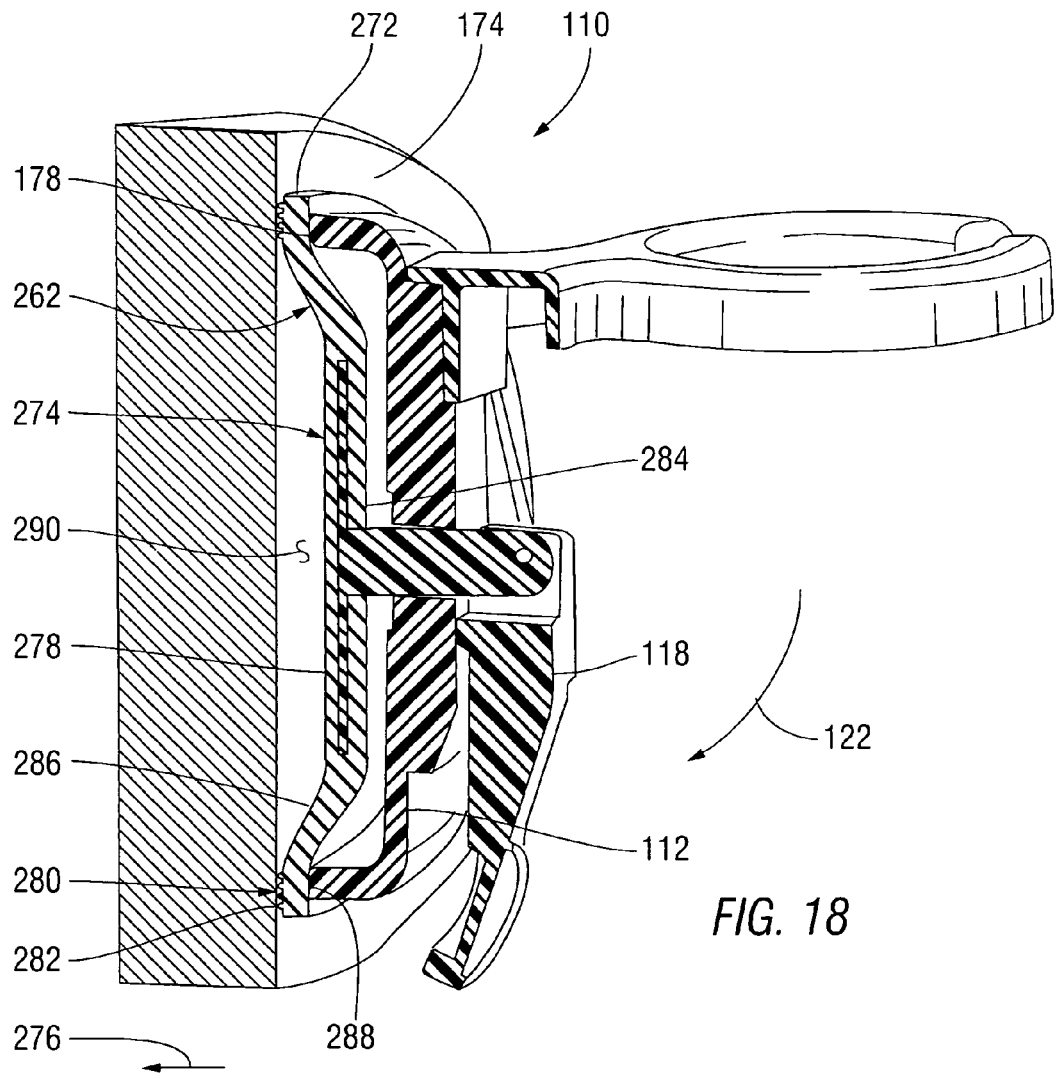
FIG. 18 is a cross-sectional perspective view of the appliance holder of FIG. 5 with the actuator therein in an actuated position, showing a second alternative suction cup employed therein, and taken as indicated by section lines 9-9 in FIG. 5.
Figure 19:
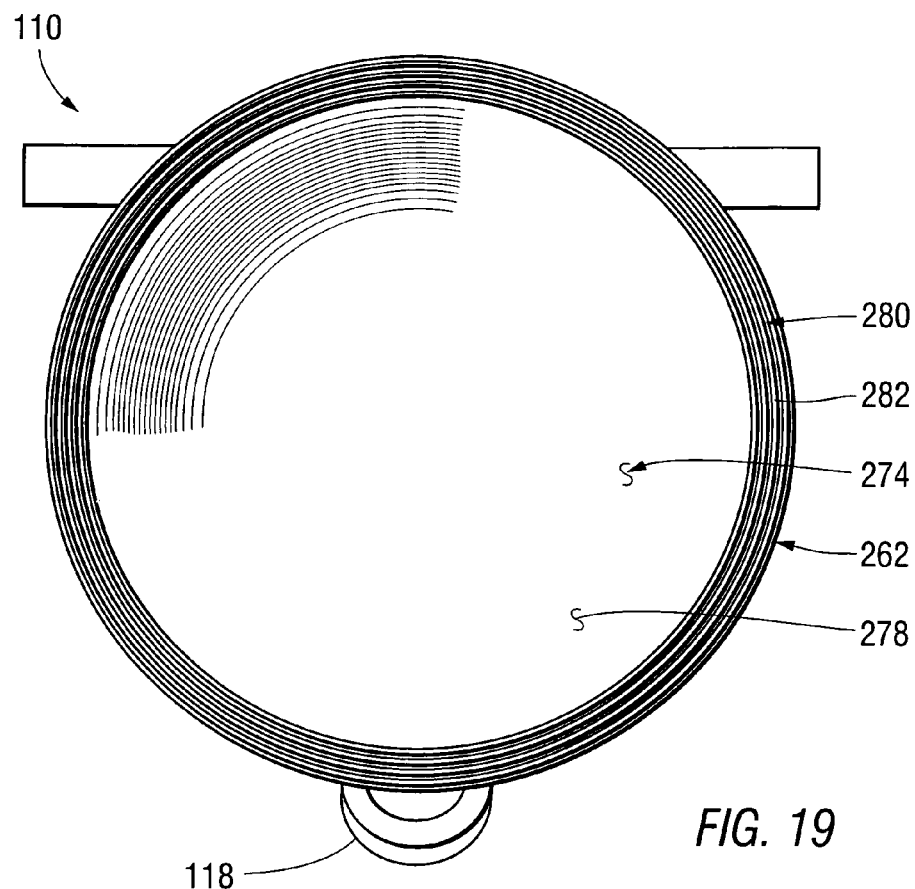
FIG. 19 is a rear elevation of the appliance holder of FIG. 18

A second alternative suction cup 262, configured for use within the device 110, described above in reference to FIGS. 5, 8, and 9, will now be discussed in reference to reference to FIGS. 18 and 19. FIG. 18 is a cross-sectional perspective view of the device 110, taken as indicated by section lines 9-9 in FIG. 5, with the pivoted actuator 118 being shown in an actuated position, and with the second alternative suction cup 262 shown in place of the suction cup 114 described above in reference to FIGS. 9 and 10. FIG. 19 is a rear elevation of the device 110, configured as shown in FIG. 18.

The second alternative suction cup 262 includes a peripheral edge 272 and an outward-facing surface 274, i.e., a surface facing outward, in the direction of arrow 276, toward the wall surface 176. The outward-facing surface 274 includes a concave central surface portion 278 and an annular peripheral surface portion 280, which in turn includes a plurality of spaced-apart concentric ridges 282. The suction cup 262 is composed of a single elastomer forming a central structural portion 284, disk-shaped structural portion 286, and an annular peripheral structural portion 288. Other features of this application of the suction cup 262 are as described above in reference to FIGS. 9 and 10. As the device 110 is held against the surface 174, an annular peripheral structural portion 288 of the suction cup 262 is held against a ring-shaped peripheral surface 178 of the housing 112. Then, the pivoted actuator 118 is moved from the released position shown in FIG. 9, in the direction of arrow 122, into the actuated position as shown in FIG. 18, enlarging a space 290 between the wall surface 174 and the suction cup 262, to form a partial vacuum within the space 290 so that the device 110 is held in place against the wall surface 174. During movement of the pivoted actuator 118, deflection occurs within the disk-shaped portion 286 of the suction cup 262.

Figure 20:
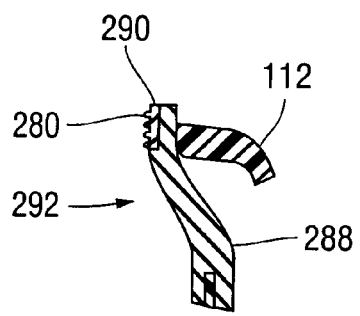
FIG. 20 is a fragmentary cross-sectional side elevation of a first alternative version of the suction cup of FIG. 18.
Figure 21:
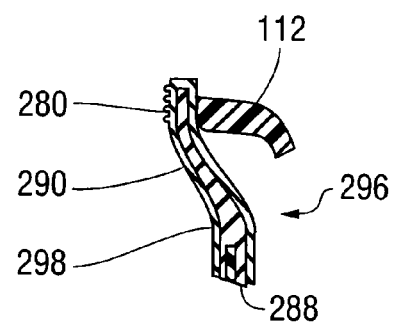
FIG. 21 is a fragmentary cross-sectional side elevation of a second alternative version of the suction cup of FIG. 18.

Alternate versions of the second alternative suction cup 262 will now be discussed, with reference being made to FIGS. 20 and 21. Each of these alternate versions includes a core 288, composed of a first elastomer, and an outer layer 290, composed of a second elastomer, which is substantially softer than the first elastomer. FIG. 20 is a fragmentary elevation of a first alternative version 292, in which the outer layer 290 forms the outer peripheral surface portion 280, while FIG. 21 is a fragmentary elevation of a second alternative version 296 in which the outer layer 290 covers other surfaces 298 of the core 288. The spaced-apart concentric ridges 282 of the second alternative suction cup 262 may alternately be formed as described above in reference to FIGS. 16 and 17.

Since the use of concentric ridges 212, 282 in the suction cups described in reference to FIGS. 11-21 increases the contact pressure between the suction cup and an adjacent wall surface, even a relatively soft material used to form the concentric ridges 212, 282 may be somewhat harder than a contact material in a flat contact surface configured for attachment to a porous surface, as described in reference to FIGS. 1-10. For example, the outer layers 232, 290 may be composed of an elastomer having a hardness in the range of Shore A 10 to Shore A 40, while the core 230, 288 is composed of an elastomer having a hardness in the range of Shore A 50 to Shore A 70. A suction cup 200, 262 composed of a single elastomer may have a hardness in the range of Shore A 50 to Shore A 70. The size of individual ridges 212, 282 may be varied considerably for suction cups of various diameters. For example, an individual ridge 212 may have a height in a range of 0.2 mm to 1 mm and a width in a range of 0.8 mm to 2 mm. Preferably, the elastomers used in suction cups 200, 262, the elastomers of cores 230, 288, and the elastomers of outer layers 232, 290 are thermoplastic elastomers, silicone rubbers, or urethane elastomers.

While preferred embodiments of the present invention have been particularly described herein, it is understood that various changes from this description can be made without departing from the spirit and scope of the invention, as described in the appended claims.

What is claimed is:

1. A suction cup comprising:
   a peripheral edge;
   an outward-facing surface having a concave central surface portion and an annular peripheral surface portion extending radially from the concave central surface portion to the peripheral edge, wherein the annular peripheral surface portion of the outward-facing surface includes a plurality of spaced-apart concentric ridges,
   a core composed of a first elastomer, forming a central structural portion, an annular structural peripheral portion, and a disk-shaped structural portion extending between the central structural portion and the annular peripheral structural portion of the suction cup; and an outer layer composed of a second elastomer, substantially softer than the first elastomer, wherein the outer layer forms at least the annular peripheral surface portion of the outward-facing surface, and wherein the outer layer additionally covers surfaces of the disk-shaped structural portion and of the central structural portion.

2. The suction cup of claim 1, wherein the second elastomer has a hardness in the range of Shore A 10 to Shore A 40.

3. The suction cup of claim 2, wherein the first elastomer has a hardness in the range of Shore A 50 to Shore A 70.

4. The suction cup of claim 1, wherein the outer layer has a thickness in the range of 0.8 mm to 1.8 mm.

5. A suction cup comprising:
a peripheral edge;
an outward-facing surface having a concave central surface portion and an annular peripheral surface portion extending radially from the concave central surface portion to the peripheral edge, wherein the annular peripheral surface portion of the outward-facing surface includes a plurality of spaced-apart concentric ridges, and wherein each of the spaced-apart concentric ridges has a height in a range of 0.2 mm to 1 mm and a width in a range of 0.8 mm to 2 mm;
a core composed of a first elastomer, forming a central structural portion, an annular structural peripheral portion, and a disk-shaped structural portion extending between the central structural portion and the annular peripheral structural portion of the suction cup; and
an outer layer composed of a second elastomer, substantially softer than the first elastomer, wherein the outer layer forms at least the annular peripheral surface portion of the outward-facing surface.

6. The suction cup of claim 5, wherein the second elastomer has a hardness in the range of Shore A 10 to Shore A 40.

7. The suction cup of claim 6, wherein the first elastomer has a hardness in the range of Shore A 50 to Shore A 70.

8. The suction cup of claim 5, wherein the outer layer has a thickness in the range of 0.8 mm to 1.8 mm.

9. Apparatus comprising a housing and a suction cup attached to the housing, wherein the suction cup includes:

a peripheral edge;
an outward-facing surface having a concave central surface portion and an annular peripheral surface portion extending radially from the concave central surface portion to the peripheral edge, wherein the annular peripheral surface portion of the outward-facing surface includes a plurality of spaced-apart concentric ridges, and wherein each of the spaced-apart concentric ridges of the suction cup has a height in a range of 0.2 mm to 1 mm and a width in a range of 0.8 mm to 2 mm,
a core composed of a first elastomer, forming a central structural structural portion, an annular structural peripheral portion, and a disk-shaped structural portion extending between the central structural portion and the annular peripheral structural portion of the suction cup; and
an outer layer composed of a second elastomer, substantially softer than the first elastomer, wherein the outer layer forms at least the annular peripheral surface portion of the outward-facing surface.

10. The apparatus of claim 9, wherein
the apparatus additionally comprises an actuator, movably attached to the housing,
the suction cup additionally comprises a core composed of a first elastomer, forming a central structural portion of the suction cup, an annular structural peripheral portion, and a disk-shaped structural portion extending between the central structural portion and the annular peripheral structural portion,
the core is attached to the actuator,
the housing includes a ring-shaped peripheral surface held in contact with the annular structural peripheral portion of the suction cup, and
the disk-shaped structural portion of the suction cup is deflected to increase a space within the concave central surface portion as the actuator is moved between a released position and an actuated position.

11. The suction cup of claim 9, wherein the second elastomer has a hardness in the range of Shore A 10 to Shore A 40.

12. The suction cup of claim 11, wherein the first elastomer has a hardness in the range of Shore A 50 to Shore A 70.

* * * * *